(12) United States Patent
Shen

(10) Patent No.: US 11,650,386 B2
(45) Date of Patent: May 16, 2023

(54) MACRO-MOLECULAR LEAKAGE-FREE SELF-ADHERING ALUMINUM FOIL AND MANUFACTURING METHOD THEREOF

(71) Applicant: HANGZHOU JULI INSULATION CO., LTD, Zhejiang (CN)

(72) Inventor: Guozhong Shen, Zhejiang (CN)

(73) Assignee: HANGZHOU JULI INSULATION CO., LTD, Hangzhou (CN)

( * ) Notice: Subject to any disclaimer, the term of this patent is extended or adjusted under 35 U.S.C. 154(b) by 854 days.

(21) Appl. No.: 16/511,469

(22) Filed: Jul. 15, 2019

(65) Prior Publication Data

US 2019/0339469 A1    Nov. 7, 2019

Related U.S. Application Data

(62) Division of application No. 15/544,328, filed as application No. PCT/IB2016/056579 on Nov. 2, 2016, now abandoned.

(30) Foreign Application Priority Data

Jan. 1, 2016    (CN) .......................... 201610000113.0
Jan. 1, 2016    (CN) ......................... 201610000122.X (Continued)

(51) Int. Cl.
*G02B 6/44*        (2006.01)
*B32B 7/14*        (2006.01)
(Continued)

(52) U.S. Cl.
CPC ............... *G02B 6/443* (2013.01); *B21B 1/00* (2013.01); *B21B 1/22* (2013.01); *B32B 3/263* (2013.01);
(Continued)

(58) Field of Classification Search
CPC ........ G02B 6/443; G02B 6/4486; B21B 1/00; B21B 1/22; B21B 2003/001; B32B 3/263;
(Continued)

(56) References Cited

U.S. PATENT DOCUMENTS 5,156,321 A * 10/1992 Liburdi .................. B23K 35/30
                                                                228/175
5,240,061 A *  8/1993 Watson .................... C23C 4/123
                                                                164/463

(Continued)

FOREIGN PATENT DOCUMENTS

| CN | 201477916 U | * | 5/2010 |
| JP | 2004115879 A | * | 4/2004 |
| JP | 2012041616 A | * | 3/2012 |

OTHER PUBLICATIONS

Umemura—JP 2004 115879 A—Mitsugi—MT—Composite joining foil and grains—2004 (Year: 2004).*

(Continued)

*Primary Examiner* — Francisco W Tschen
*Assistant Examiner* — Abhishek A Patwardhan

(57) ABSTRACT

A macro-molecular leakage-free self-adhering aluminum foil has two layers of aluminum foil compounded using a PET film, and the other surfaces of each layer coated with a modified PE adhesive layer respectively; or air gaps in one surface or two surfaces are filled with nano-aluminum to form a permeable air gap-free surface. The foil has advantages: 1, high folding resistance, fatigue resistance and strength 2, wrapping self-adhering performance is good, and stripping strength formed after adhesion is several times as high as that of the prior art; 3, air gaps in the surface of the aluminum foil filled with nano-aluminum powder result in improved compactness; manufacture from low-grade aluminum foil, and so that rolling precision requirements are lowered, and manufacturing cost reduced; 4, insulating (Continued)

strength is high, shielding effect is good, the return loss phenomenon is avoided, and tensile strength is good.

4 Claims, 2 Drawing Sheets

(30) Foreign Application Priority Data

Jan. 1, 2016 (CN) .......................... 201620000221.3
Jan. 1, 2016 (CN) .......................... 201620000227.0

(51) Int. Cl.
| | |
|---|---|
| *B32B 15/09* | (2006.01) |
| *C23C 24/06* | (2006.01) |
| *B32B 15/00* | (2006.01) |
| *B32B 3/26* | (2006.01) |
| *B32B 27/36* | (2006.01) |
| *B32B 7/12* | (2006.01) |
| *B21B 1/00* | (2006.01) |
| *B21B 1/22* | (2006.01) |
| *B32B 37/00* | (2006.01) |
| *B32B 5/16* | (2006.01) |
| *B32B 15/16* | (2006.01) |
| *B32B 15/20* | (2006.01) |
| *B32B 37/20* | (2006.01) |
| *B21B 3/00* | (2006.01) |
| *B32B 37/12* | (2006.01) |
| *H01B 11/10* | (2006.01) |
| *B32B 37/24* | (2006.01) |

(52) U.S. Cl.
CPC .................. *B32B 5/16* (2013.01); *B32B 7/12* (2013.01); *B32B 7/14* (2013.01); *B32B 15/00* (2013.01); *B32B 15/09* (2013.01); *B32B 15/16* (2013.01); *B32B 15/20* (2013.01); *B32B 27/36* (2013.01); *B32B 37/003* (2013.01); *B32B 37/203* (2013.01); *C23C 24/06* (2013.01); *G02B 6/4486* (2013.01); *B21B 2003/001* (2013.01); *B32B 37/12* (2013.01); *B32B 2037/243* (2013.01); *B32B 2255/06* (2013.01); *B32B 2255/205* (2013.01); *B32B 2255/26* (2013.01); *B32B 2307/206* (2013.01); *B32B 2307/212* (2013.01); *B32B 2307/406* (2013.01); *B32B 2307/548* (2013.01); *B32B 2307/554* (2013.01); *B32B 2307/558* (2013.01); *B32B 2307/7242* (2013.01); *B32B 2307/734* (2013.01); *B32B 2311/24* (2013.01); *B32B 2367/00* (2013.01); *H01B 11/1008* (2013.01)

(58) Field of Classification Search
CPC .... B32B 5/16; B32B 7/12; B32B 7/14; B32B 15/00; B32B 15/09; B32B 15/16; B32B 15/20; B32B 27/36; B32B 37/003; B32B 37/203; B32B 37/12; B32B 2037/243; B32B 2255/06; B32B 2255/205; B32B 2255/26; B32B 2307/206; B32B 2307/212; B32B 2307/406; B32B 2307/548; B32B 2307/554; B32B 2307/558; B32B 2307/7242; B32B 2307/734; B32B 2311/24; B32B 2367/00; C23C 24/06; H01B 11/1008
See application file for complete search history.

(56) References Cited

U.S. PATENT DOCUMENTS

2009/0297701 A1* 12/2009 Jabado .................... F01D 5/005
427/140
2013/0331515 A1* 12/2013 Kawamoto ............. C08K 5/20
524/706

OTHER PUBLICATIONS

Keles—Aluminum_foil_Its_typical_quality_problems—J.Mat.Proc. Tech.—2007 (Year: 2007).*
MT of Hirata—JP 2012-041616 A—hole closing method for metal films—2012 (Year: 2012).*
Shen—CN 2014-77916 U—MT—Double-sided self-adhesive aluminum foil—w—figure (Year: 2014).*

* cited by examiner

MACRO-MOLECULAR LEAKAGE-FREE SELF-ADHERING ALUMINUM FOIL AND MANUFACTURING METHOD THEREOF

CROSS REFERENCE APPLICATIONS

This application is a divisional of U.S. patent application Ser. No.: 15/544,328 filed Jul. 18, 2017, which is a 371 of International Application PCT/IB2016/056579 filed Nov. 2, 2016, which claims the benefit of Chinese Applications Nos.: 2016200002270 filed Jan. 1, 2016, 2016200002213 filed Jan. 1, 2016, 2O1610000122X filed Jan. 1, 2016 and 2016100001130 filed Jan. 1, 2016 the contents of which are incorporated herein by references.

TECHNICAL FIELD

The present invention relates to a micro-molecular, leakage-free double-foil self-adhering aluminum foil which has good folding resistance and fatigue resistance, high strength, good shielding property and no return loss, and also has high-reliability self-adhesion strength, and a manufacturing method thereof, belonging to the field of communication auxiliary materials.

BACKGROUND ART

The preceding patent CN201489850U, entitled "High-strength Double-surfaced Self-adhesive Aluminum Foil" possessed by the applicant comprises an aluminum foil and is characterized in that a layer of bonded adhesive is provided between two surfaces of the aluminum foil and a polyethylene terephthalate (PET) film respectively, and the surface of the PET film (1) is provided with a self-adhesive film. The need for improvement lies in that: in the production process of a common aluminum foil, due to lack of purity of aluminum ingots or presence of impurities and owing to the surface gloss of a rolling roll or other factors, the rolled aluminum foil contains micropores and other defects, and these defects directly result in the communication signal attenuation and increased return loss of the wrapped cable.

The Patent CN103785800A, entitled "A Production Method for Double-Zero Aluminum Foil" comprises the following steps: subjecting an aluminum-alloy molten mass to cast rolling to produce a cast rolled coil with die thickness of 6.5-8.0 mm after degassing and deslagging, subjecting the cast rolled coil to first cold rolling to produce an aluminum coil with the thickness of 2.0-3.0 mm, performing first heat treatment on the aluminum coil subjected to the first cold rolling at the temperature of 450-550° C. for 15-20 hours, subjecting the aluminum coil subjected to the first heat treatment to second cold rolling to produce an aluminum coil with the thickness of 0.6-0.8 mm, and performing second heat treatment on the aluminum coil subjected to the second cold rolling at the temperature of 300-380° C. for 6-12 hours; subjecting the aluminum coil subjected to the second heat treatment to third cold rolling to produce an aluminum coil with the thickness of 0.05-0.1 mm, then heating the aluminum coil in heat treatment equipment to the aluminum-foil recrystallization critical temperature of 250-310° C. keeping the aluminum coil at the temperature for 5-10 hours such that the crystal grain structure of the aluminum foil changes, and subjecting an aluminum foil to fourth cold rolling to produce the double-zero aluminum foil with the thickness of 0.006-0.009 mm. The shortcomings are as follows: it is still not possible to solve the problem that pore and gap defects occur on the surface of the rolled aluminum foil due to small impurities of aluminum itself and unclean roll surface in the aluminum foil rolling process, and these pores and gaps will result in attenuation of a communication signal, interference of external signals to the communication signal and occurrence of return loss phenomenon when the aluminum foil is used for wrapping communication cables and cable shields.

SUMMARY OF THE INVENTION

Purpose of design is: to avoid the shortcomings in the background, to provide a macro-molecular, leakage-free, self-adhering aluminum foil, which has good folding resistance and fatigue resistance, high strength, good shielding property and no return loss, and has high-reliability self-adhesive strength, and a manufacturing method thereof, as well as an aluminum foil air gap filling production line and a filling method, which can be used not only for effectively filling and sealing through holes and gaps present in the surface of the aluminum foil itself, but also filling and repairing grooves and line slots present in the surface of the aluminum foil itself, are designed.

The scheme of design is adopted to achieve said purpose of design. 1. The design in which the first layer of aluminum foil and the second layer of aluminum foil are compounded using a PET film is the first technical feature of the present invention. Such purpose of design lies in that: PET is a milky white or light yellow, highly crystalline polymer and has a smooth and glossy surface. PET has excellent physical and mechanical properties over a relatively wide temperature range, up to 120° C. after being used for a long time, has excellent electrical insulation, better electrical properties even at high temperature and high frequency, and favorable creep resistance, fatigue resistance, abrasion resistance and dimensional stability, and has the impact strength 3 to 5 times as large as that of the other film, and good folding resistance. According to the present invention, the PET film is placed between the two layers of aluminum foils, so that the folding resistance and strength of the aluminum foil can be fundamentally improved, and due to the compounding of the two layers of aluminum foils using the PET film, the pores generated in the rolling process of the aluminum foil itself are furthest compensated by the two layers of aluminum foil as a result of staggering of the pores, thereby furthest avoiding the occurrence of the phenomenon of communication signal attenuation. 2. The design in which air gaps in one surface or two surfaces of the aluminum foil are filled and repaired using nano-aluminum powder is the second technical feature of the present invention. Such purpose of design lies in that: the average particle size of the nano-aluminum powder is 55 nm, and the pores and gaps generated in the rolling process of aluminum foil are often larger than 55 nm, so it can fill the permeable or impermeable pores and gaps generated in the rolling process of the aluminum foil, without increasing the thickness of the aluminum foil itself, so that the shielding property of the aluminum foil is fundamentally increased to avoid the occurrence of return loss phenomenon. 3. The purpose of adopting modified polyethylene (PE) lies in that; it can be used to bond a cable jacket powerfully; in a construction environment of outside high-altitude operations or small space operations, due to powerful adhesion bonding of the aluminum foil to jacket plastic using the modified PE in the last procedure of the cable (cabling), the aluminum foil is peeled off while the outer jacket PE or PVC plastic is clipped off by wire striping pliers, thereby speeding up the construction progress and improving the safety of construction workers. 4. The design in which an aluminum foil air gap detection device is used to check whether aluminum foil has pores or gaps and the nano-aluminum powder spraying device end the nano-aluminum powder rolling forming device are used to repair the pores and gaps is the fourth technical feature of the present invention. Such purpose of design lies in that; since the aluminum foil air gap detection device is composed of a dark box, a light-emitting source and a photosensitive sensor and the dark box is provided with an aluminum foil inlet and an aluminum foil outlet, when an aluminum foil for communication optical cables and cables enters the dark box from the inlet of the dark box and then exits from the dark box, the dark box is just divided into an upper cavity and a lower cavity by the aluminum foil owing to its proper width; when the aluminum foil has no pores and gaps, light emitted from the light-emitting source provided inside the lower cavity cannot penetrate through the aluminum foil, there is no light in the upper cavity of the dark box, and therefore it is indicated that the aluminum foil has no pore or gap phenomenon; on the contrary, when light is present in the upper cavity of the dark box, it is indicated that the aluminum foil has pores and gaps, and at this moment, a signal output end of the photosensitive sensor mounted in the upper cavity is connected to a programmable logic controller (PLC), the PLC controller instructs a nano-aluminum powder spraying nozzle inside a nano-aluminum powder spraying device to spray nano-aluminum powder to the surface of the aluminum foil having pores and gaps, and the nano-aluminum powder is then rolled by a double-roll rolling roll in the nano-aluminum powder rolling forming device; since the double-roll rolling roll has a function of adhering articles and a self-heating function, it can be used to not only roll and repair the pores and gaps in the surface of the aluminum foil by filling the nano-aluminum powder, but also roll and repair grooves and line slots in the surface of the aluminum foil, and finally high-grade aluminum foil can be obtained by removing excessive nano-aluminum powder using a surface cleaning brush. 5. The design in which the surface of the aluminum foil generates static using an electrostatic friction generator is the fifth technical feature of the present invention. Such purpose of design lies in that: since upper and lower pile (velvet-like) pads are made of a material which is prone to generate static in the present application, the aluminum foil is rubbed by pile to generate static when being forcefully passed through a space between the upper and lower pile pads; when the aluminum foil with static passes through the nano coating device, the nano-aluminum powder in the nano coating device forms pressurized nano-aluminum powder in case that upper and lower cylinders push a piston, and therefore, after being adhered onto the surface of the aluminum foil with static, the nano-aluminum powder is rolled by the double-roll rolling roll in the nano-aluminum powder rolling forming device; since the double-roll rolling roll has a function of adhering articles and a self-heating function, it can be used to not only roll and repair the pores and gaps in the surface of lite aluminum foil by filling the nano-aluminum powder, but also roll and repair groves and line slots in the surface of the aluminum foil, and finally high-grade aluminum foil can be obtained by removing excessive nano-aluminum power using a surface cleaning brush. 6. The design in which one surface of the aluminum foil is compounded with the PET film using an adhesive is the sixth technical feature of the present invention. Such purpose of design lies in that: PET is a milky white or light yellow, highly crystalline polymer and has a smooth and glossy surface. PET has excellent physical and mechanical properties within a relatively wide temperature range, has a temperature up to 120° C. after being used for a long time, has excellent electrical insulation, better electrical properties even at high temperature and high frequency, and favorable creep resistance, fatigue resistance, abrasion resistance and dimensional stability, and has the impact strength 3 to 5 times as large as that of the other film, and good folding resistance.

The technical solution 1 is as follows: there is provided a macro-molecular leakage-free self-adhering aluminum foil, wherein air gaps in one surface or two surfaces of a first layer of aluminum foil or a second layer of aluminum foil are filled with nano-aluminum to form a permeable air gap-free surface, one surface of the first layer of aluminum foil and one surface of the second layer of aluminum foil are compounded with the PET film using an adhesive, and the other surface of the first layer of aluminum foil and the other surface of the second layer of aluminum foil are coated with a modified PE adhesive layer respectively.

The technical solution 2 is as follows: there is provided a macro-molecular leakage-free self-adhering aluminum foil, wherein air gaps in one surface or two surfaces of the aluminum foil are filled with nano-aluminum to form a permeable air gap-free surface, lite PET film is compounded with one surface of the aluminum foil using an adhesive, and the other surface of the aluminum foil is coated with a modified PE adhesive layer.

The technical solution 3 is as follows: there is provided a preparation method for a macro-molecular leakage-free self-adhering aluminum foil, comprising the following steps: 1) filling one surface or two surfaces of each of a first layer of aluminum foil and a second layer of aluminum foil with nano-aluminum powder with the same attribute, such that no permeable air gaps are present in the surface of the aluminum foil; 2) then, placing a PET film between the first layer of aluminum foil and the second layer of aluminum foil, and compounding into a whole by adhering with an adhesive; 3) coating a non-compounded surface of each of the first layer of aluminum foil and the second layer of aluminum foil with a modified PE adhesive, and drying to obtain a modified PET film; or 1) filling one surface or two surfaces of the aluminum foil with nano-aluminum with the same attribute, such that no permeable air gaps are present in the aluminum foil surface; 2) then, compounding a PET film to one surface of the aluminum foil using an adhesive; 3) coating a non-compounded surface of the aluminum foil with a modified PE adhesive, and drying to obtain a modified PET film The technical solution 4 is as follows: there is provided an air gap filling production line for a macro-molecular leakage-free self-adhering aluminum foil, comprising a PLC controller, wherein an aluminum foil air gap detection device, a nano-aluminum powder spraying device and a nano-aluminum powder rolling forming device are sequentially provided between an aluminum foil unreeling roll and an aluminum foil reeling roll; a photoelectric signal output end of the aluminum foil air gap detection device is connected to a signal input end of the PLC controller, one of signal output ends of the PLC controller is connected to a signal input end of the nano-aluminum powder spraying device, and the other signal output end of the PLC controller is connected to a signal input end of a servo motor; the servo motor drives the transmission of the aluminum foil reeling roll. The technical solution 5 is as follows: there is provided a filling method for an aluminum foil air gap filling production line, wherein during working, the PLC controller instructs a servo motor to drive the aluminum foil reeling roll and the double-roll rolling roll in the nano-aluminum powder rolling forming device to rotate; a detected aluminum foil enters a dark box of the aluminum foil air gap detection device from the aluminum foil unreeling roll under the traction of the aluminum foil reeling roll; when the surface of the detected aluminum foil is previous to light, the photosensitive sense located in the dark box is triggered to transmit a location signal of a detected air gap in the aluminum foil to the PLC controller, at the instant when the aluminum foil having air gaps passes through the nano-aluminum powder spraying nozzle in the nano-aluminum powder spraying device, the PLC controller instructs the nano-aluminum powder spraying nozzle in the nano-aluminum powder spraying device to spray nano-aluminum powder to the air gap portion on the surface of the aluminum foil; when the aluminum foil to which the nano-aluminum powder is sprayed passes through the double-roll rolling roll in the nano-aluminum powder rolling forming device, the nano-aluminum powder is compacted by the double-roll rolling roll, excessive nano-aluminum powder on the surface of the aluminum foil is removed by the surface cleaning brush, and finally the aluminum foil is reeled by the aluminum foil reeling roll.

The technical solution 6 is as follows: there is provided an aluminum foil air gap repair production line, wherein an electrostatic friction generator, a nano coating device and a nano-aluminum powder rolling forming device are sequentially provided between the aluminum foil unreeling roll and the aluminum foil reeling roll; each of the electrostatic friction generator, the nano coating device and the nano-aluminum powder rolling forming device is provided with an inlet and an outlet allowing the aluminum foil to enter and exit; after the aluminum foil is discharged from the aluminum foil reeling roll, the aluminum foil sequentially passes through the electrostatic friction generator, the nano coating device and the nano-aluminum powder grinding forming device, and the repaired aluminum foil is reeled by the aluminum foil reeling roll which is driven by a speed reduction motor to rotate.

The technical solution 7 is as follows: there is provided a filling method for the aluminum foil air gap repair production line, wherein during working, a switch of the motor is started, the motor drives the aluminum foil reeling roll and the double-roll rolling roll in the nano-aluminum powder rolling forming device to rotate, and the aluminum foil enters the electrostatic friction generator from the aluminum foil unreeling roll under the traction of the aluminum foil reeling roll and is subject to forceful friction by the upper and lower pile pads in the electrostatic friction generator, such that the surface of the aluminum foil generates static; when the aluminum foil whose surface has static passes through the nano coating device, nano-aluminum powder in the nano coating device is adhered to the surface of the aluminum foil, and by means of the rolling of the double-roll rolling roll in the nano-aluminum powder rolling forming device, the nano-aluminum powder is then compacted by the double-roll rolling roll to well repair air gaps in the surface of the aluminum foil; excessive nano-aluminum powder on the surface of the aluminum foil is removed by the surface cleaning brush, and finally the aluminum foil is reeled by the aluminum foil reeling roll.

Compared with the background art, the macro-molecular leakage-free self-adhering aluminum foil of the present invention has the advantages: 1, the aluminum foil has high folding resistance, fatigue resistance and high strength which are several times as high as those of the background art; 2, the wrapping self-adhering performance is good, and stripping strength formed after adhesion is several times as high as that of the background art; 3, air gaps in the surface of the aluminum foil are filled and repaired with nano-aluminum with the same attribute, not only the compactness of the aluminum foil is greatly improved, but also the purpose of manufacturing the high-grade macro-molecular leakage-free double-foil self-adhering aluminum foil from low-grade aluminum foil is achieved, the additional value is greatly promoted, and therefore the requirement for the rolling precision of the aluminum foil is greatly lowered, and the manufacturing cost of the aluminum foil is reduced; 4, the filled and repaired communication aluminum foil has high insulating strength and good shielding effect, the return loss phenomenon is avoided such that it can be used to shield high throughput cable, and the tensile strength is good, therefore unexpected technical effects and economic benefits are achieved.

DETAILED DESCRIPTION OF THE PREFERRED EMBODIMENTS

Figure 1:
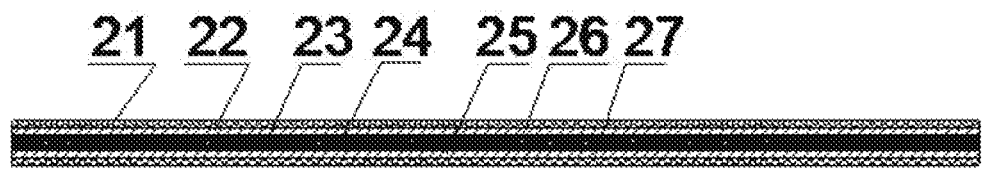
FIG. 1 is a structural schematic drawing of the macro-molecular leakage-free double-foil self-adhering aluminum foil.
Figure 3:
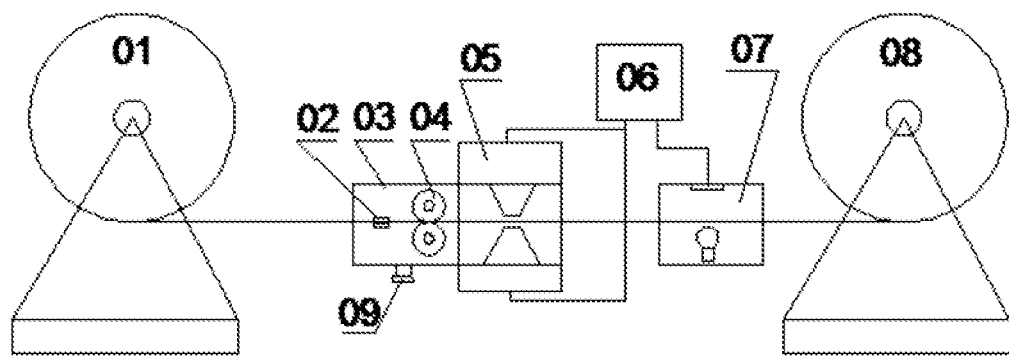
FIG. 3 is a schematic drawing of the aluminum foil pore and gap filling production line.
Figure 4:
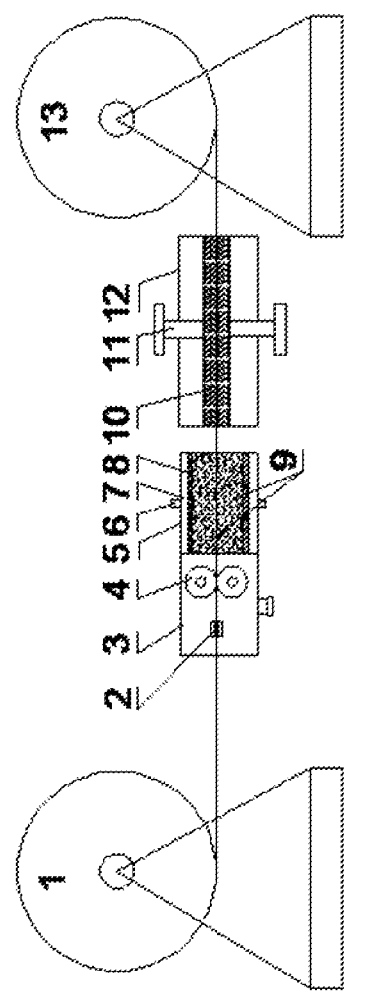
FIG. 4 is a structural schematic drawing of the aluminum foil air gap repair production line.

Embodiment 1: refer to FIGS. 1 and 3. There is provided a macro-molecular leakage-free self-adhering aluminum foil, wherein air gaps in one surface or two surfaces of a first layer of aluminum foil 22 or a second layer of aluminum foil 25 are filled with nano-aluminum powder to form a permeable air gap-free surface, one surface of the first layer of aluminum foil 22 and the second layer of aluminum foil 25 are compounded with a PET film 24 into a whole using an adhesive 23 and an adhesive 26, and the other surface of the first layer of aluminum foil 22 and the other surface of the second layer of aluminum foil 25 are coated with a modified PE adhesive layer 21 and 27 respectively.

The surface of the first layer of aluminum foil 22 or the second layer of aluminum foil 25 is a permeable air gap-fee surface, i.e., air gaps (air gaps refer to micropores and gaps, i.e., small through holes and gaps generated by impurities of the aluminum foil and a rolling roll itself in an aluminum foil rolling process) in one surface or two surfaces of the first layer aluminum foil 22 or the second layer of aluminum foil 25 are filled with nano-aluminum powder, such that the compactness of the aluminum foil is further improved.

Figure 2:
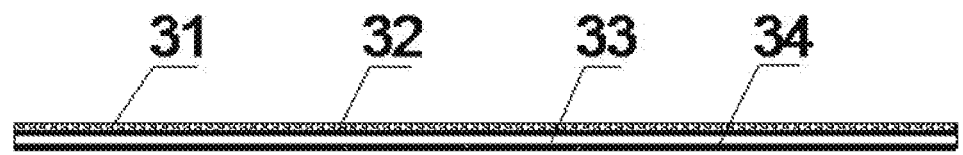
FIG. 2 is a structural schematic drawing of the macro-molecular leakage-free self-adhering aluminum foil.

Embodiment 2: refer to FIGS. 2 and 3. There is provided a macro-molecular leakage-free self-adhering aluminum foil, wherein air gaps in one surface or two surfaces of the aluminum foil 33 are filled with nano-aluminum to form a permeable air gap-free surface, the PET film 33 is compounded with one surface of the aluminum foil 33 using an adhesive 32, and the other surface of the aluminum foil 33 is coated with a modified PF adhesive layer 34. Air gaps refer to micropores and gaps, i.e., small through holes and gaps generated by impurities of the aluminum foil and a rolling roll itself in an aluminum foil rolling process are filled with nano-aluminum, such that the compactness of the aluminum foil is further improved.

Embodiment 3: there is provided a preparation method for a macro-molecular leakage-free double-foil self-adhering aluminum foil on the basis of embodiment 1 or 2, comprising the following steps: 1) filling one surface or two surfaces of a first layer of aluminum foil 22 or a second layer of aluminum foil 25 or each of the first layer of aluminum foil 22 and the second aluminum foil 25 with nano-aluminum powder with the same attribute, such that no permeable air gaps are present in the surface of the aluminum foil; 2) then, placing a PET film 24 between the first layer of aluminum foil 22 and the second layer of aluminum foil 25, and compounding into a whole by adhering with an adhesive; 3) coating a non-compounded surface of each of the first layer of aluminum foil 22 and the second layer of aluminum foil 25 with a modified PE adhesive, and drying to obtain a modified PET film:

or 1) filling one surface or two surfaces of the aluminum foil 33 with nano-aluminum with the same attribute, such that no permeable air gaps are present in the surface of the aluminum foil; 2) then, compounding a PET film 34 to one surface of the aluminum foil 33 using an adhesive 32; 3) coating a non-compounded surface of the aluminum foil with a modified PE adhesive 34, and drying to obtain a modified PET film.

Before coating, it is possible to perform a water sprinkling test on the surface of the aluminum foil, and if failing to meet the A-level standard, surface treatment is required to enhance the adhesion of modified PE adhesive on the surface of the aluminum foil, avoid anti-sticking phenomenon and improve the use stability and effect stability.

The adhesive is coated uniformly using a fully carved cementing plate, such that uniform viscosity and neatly coiling, large coil diameter, large length, improved production efficiency and yield are achieved in the use process.

Embodiment 4: refer to FIG. 2. An aluminum foil air gap filling production line comprises a PLC controller 06, wherein an aluminum foil air gap detection device 07, a nano-aluminum powder spraying device 05 and a nano-aluminum powder rolling forming device 03 are sequentially provided between an unreeling roll 08 and a reeling roll 01; a photoelectric signal output end of the aluminum foil air gap detection device 07 is connected to a signal input end of the PLC controller 06, one of signal output ends of the PLC controller 06 is connected to a signal input end of the nano-aluminum powder spraying device 05, and the other signal output end of the PLC controller 06 is connected to a signal input end of a servo motor; the servo motor drives the transmission of the reeling roll 01. The aluminum foil air gap detection device 07 is composed of a dark box, a light-emitting source and a photosensitive sensor 06; the dark box is provided with an aluminum foil inlet and an aluminum foil outlet; the light-emitting source is located at the lower part inside the dark box and also located below the aluminum foil; the photosensitive sensor 06 is located at the upper part inside the dark box, and a signal output end of the photosensitive sensor 06 is connected to the signal input end of the PLC controller. The nano-aluminum powder spraying device 05 is composed of a nano-aluminum powder storage box, a nano-aluminum powder spraying nozzle and a nano spraying enclosed box; the nano spraying enclosed box is provided with an aluminum foil inlet and an aluminum foil outlet; the nano-aluminum powder spraying nozzle rightly faces the surface of the aluminum foil, and whether the nano-aluminum powder spraying nozzle works is controlled by the PLC controller. The nano-aluminum powder rolling forming device 03 is composed of an enclosed box, a double-roll rolling roll 04 and a surface cleaning brush 02; the double-roll rolling roll 04 (roll surfaces of the double-roll rolling roll do not stick the nano-aluminum powder when used for rolling the nano-aluminum powder, thereby not sticking a material roll, and the double-roll rolling roll can be designed into a self-heating rolling roll, i.e., air gaps in the surface of the aluminum foil are filled with the nano-aluminum powder which is heated at the instant of being rolled, thereby achieving a sealing purpose) is distributed at the aluminum foil inlet portion inside the enclosed box and is driven by a servo motor rotate: whether the servo motor works is controlled by the PLC controller; the surface cleaning brush 02 is distributed at the outlet of the double-roll rolling roll 04 inside the enclosed box. The clearance between two rolls in the double-roll rolling roll 04 is adjustable, i.e., the purpose of adjusting the clearance between the two rolls can be achieved just by adjusting up or down movements of the upper roll in the double-roll rolling roll 04. A brush head of the surface cleaning brush 02 is a brush head, or a pile brush head or a cloth brush head. The bottom of the enclosed box in the nano-aluminum powder rolling forming device 03 is provided with a discharging hole which is sealed by a screw cap 09 in a spinning manner.

Embodiment 5: there is provided a filling method for an aluminum foil surface air gap production line on the basis of embodiment 3, wherein during working, the PLC controller 06 instructs a servo motor to drive the reeling roll 01 and the double-roll rolling roll 04 in the nano-aluminum powder rolling forming device 03 to rotate; a detected aluminum foil enters the dark box of the aluminum foil air gap detection device 07 from the unreeling roll 08 under the traction of the reeling roll 01; when the surface of the detected aluminum foil is previous to light, the photosensitive sensor 06 located in the dark box is triggered to transmit a location signal of a detected air gap in the aluminum foil to the PLC controller; at the instant when the aluminum foil having air gaps passes through the nano-aluminum powder spraying nozzle in the nano-aluminum powder spraying device 05, the PLC controller instructs die nano-aluminum powder spraying nozzle in the nano-aluminum powder spraying device 05 to spray nano-aluminum powder to the air gap portion on the surface of the aluminum foil; when the aluminum foil to which the nano-aluminum powder is sprayed passes through the double-roll rolling roll 04 in the nano-aluminum powder rolling forming device 03 (roll surfaces of the double-roll rolling roll do not stick the nano-aluminum powder when used for rolling the nano-aluminum powder, thereby not sticking a material roll, and the double-roll rolling roll can be designed into a self-heating rolling roll. i.e., the nano-aluminum powder is combined with air gaps in the surface of the aluminum foil at the instant after the nano-aluminum powder is heated at the instant of being rolled, thereby achieving a sealing purpose), the nano-aluminum powder is compacted by the double-roll rolling roll, excessive nano-aluminum powder on the surface of the aluminum foil surface is removed by the surface cleaning brush 02 (a brush held of the surface cleaning brush 02 is a brush head, or a pile brush head or a cloth brush head), and finally the aluminum foil is reeled by the reeling roll 02.

Embodiment 6: refer to FIGS. 1 and 3 or FIGS. 2 and 3. There is provided an aluminum foil air gap repair production line, wherein an electrostatic friction generator 12, a nano coating device 5 and a nano-aluminum powder rolling forming device 3 are sequentially provided between an aluminum foil unreeling roll 13 and an aluminum foil reeling roll 1; each of the electrostatic friction generator 12, the nano coating device 5 and the nano-aluminum powder rolling forming device 3 is provided with an inlet and an outlet allowing the aluminum foil to enter and exit; after the aluminum foil is discharged from the aluminum foil reeling roll 1, the aluminum foil sequentially passes through the electrostatic friction generator 12, the nano coating device 5 and the nano-aluminum powder grinding forming device 3, and the repaired aluminum foil is reeled by the aluminum foil reeling roll 13 which is driven by a speed reduction motor to rotate. That is, the aluminum foil sequentially enters from the inlet of the electrostatic friction generator 12 and exits from the outlet of the electrostatic friction generator 12, then enters directly from the inlet of the nano coating device 5 and exits from the outlet of the nano coating device 5, then enters directly from the inlet of the nano-aluminum powder rolling forming device 3 and exits from the outlet of the nano-aluminum powder rolling forming device 3, and is then reeled by the aluminum foil reeling roll 13; the aluminum foil reeling roll 13 is driven by a speed reduction motor to rotate.

The electrostatic friction generator 12 is composed of a box body, upper and lower pile pads 10, and a screw rod adjusting mechanism 11; the box body is provided with an aluminum foil inlet and an aluminum foil outlet; the upper and lower pile pads 10 are located in the box body and are connected with the screw rod adjusting mechanism 11 respectively via respective pile pad fixing plate; a screw rod in the screw rod adjusting mechanism 11 is in spinning fit to a screw thread in an upper end plate of the box body and used to adjust the contact force between the upper and lower pile pads.

A nano-aluminum powder coating cavity 9 is located in the middle of the nano coating device 5 and provided with an aluminum foil inlet and an aluminum foil outlet; a piston 8 and a cylinder cavity (7) are respectively located at the upper part and the lower part of the nano-aluminum powder coating cavity; the cylinder cavity is provided with an air inlet 6.

The nano-aluminum powder rolling forming device 3 is composed of an enclosed box, a double-roll rolling roll 4 and a surface cleaning brush 2; the double-roll rolling roll 4 is distributed at an aluminum foil inlet portion inside the enclosed box and is driven by a speed reduction motor to rotate; the surface cleaning brush 2 is distributed at an outlet of the double-roll rolling roll 4. The clearance between two rolls in the double-roll rolling roll 4 is adjustable. A brush head of the surface cleaning brush 2 is a brush head, or a pile brush head or a cloth brush head.

Embodiment 7: there is provided a filling method for the aluminum foil air gap repair production line, wherein during working, a switch of the motor is started, the motor drives the aluminum foil reeling roll 1 and the double-roll rolling roll 4 in the nano-aluminum powder rolling forming device 3 to rotate, and the aluminum foil enters the electrostatic friction generator 12 from the aluminum foil unreeling roll 13 under the traction of the aluminum foil reeling roll 1 and is subject to forceful friction by the upper and lower pile pads in the electrostatic friction generator 12, such that the surface of the aluminum foil generates static; when the aluminum foil whose surface has static passes through the nano coating device 5, nano-aluminum powder in the nano coating device 5 is adhered to the surface of the aluminum foil, and by means of the rolling of the double-roll rolling roll 4 in the nano-aluminum powder rolling forming device 3 (roll surfaces of the double-roll rolling roll do not slick the nano-aluminum powder when used for rolling the nano-aluminum powder, thereby not sticking a material roll, and the double-roll rolling roll can be designed into a self-heating rolling roll, i.e., the nano-aluminum powder is combined with air gaps in the surface of the aluminum foil at the instant after the nano-aluminum powder is heated at the instant of being rolled, thereby achieving a sealing purpose), the nano-aluminum powder is then compacted by the double-roll rolling roll to well repair air gaps in the surface of the aluminum foil; excessive nano-aluminum powder on the surface of the aluminum foil is removed by the surface cleaning brush, and finally the aluminum foil is reeled by the aluminum foil reeling roll 1.

It needs to be understood that: a more detailed literal description is made for the design thought of the present invention in the above embodiments, but these literal descriptions are just simple embodiments of the present invention, rather than limiting the present invention. Any combination, addition or amendment which does not go beyond the present invention should fall into the protection scope of the present invention.

The invention claimed is:

1. A filling method for an air gap filling production line for a macro-molecular leakage-free self-adhering aluminum foil, wherein during working, a programmable logic controller (PLC) a servo motor to drive an aluminum foil reeling roll and a double-roll rolling roll in a nano-aluminum powder rolling forming device to rotate; a detected aluminum foil enters a dark box of an aluminum foil air gap detection device from the aluminum foil unreeling roll under a traction of the aluminum foil reeling roll; when a surface of the detected aluminum foil is pervious to light, a photo-sensitive sensor located in the dark box is triggered to transmit a location signal of an air gap in the detected aluminum foil to the PLC controller; at an instant when an aluminum foil having air gaps passes through a nano-aluminum powder spraying nozzle in the nano-aluminum powder spraying nozzle, the PLC controller instructs the nano-aluminum powder spraying nozzle in a nano-aluminum powder spraying device to spray nano-aluminum powder to air gap protections on a surface of the aluminum foil; when the aluminum foil to which nano-aluminum powder is sprayed passes through the double-roll rolling roll in the nano-aluminum powder rolling forming device, the nano-aluminum powder is compacted by the double-roll rolling roll, excessive nano-aluminum powder on the surface of the aluminum foil is removed by a surface cleaning brush, and finally the aluminum foil is reeled by the aluminum foil reeling roll.

2. A method for producing a macro-molecular leakage-free self-adhering aluminum foil wherein air gaps in one surface or two surfaces of a first layer of aluminum foil and a second layer of aluminum foil are filled with nano-aluminum powder to form a permeable air gap-free surface, one surface of the first layer of aluminum foil and one surface of the second layer of aluminum foil are compounded with a polyethylene terephthalate (PET) film using an adhesive, and the other surface of the first layer of aluminum foil and the other surface of the second layer of aluminum foil are coated with a modified polyethylene adhesive layer respectively;

said method comprising the steps of:
1) filling at least regions of one surface or two surfaces of each of the first layer of aluminum foil and the second layer of aluminum foil with nano-aluminum powder, such that no permeable air gaps are present in the surface of the aluminum foil;
2) then, placing the polyethylene terephthalate (PET) film between the first layer of aluminum foil and the second layer of aluminum foil, and compounding into a whole by adhering with the adhesive; making the first layer of aluminum foil and the second layer of aluminum foil one side laminated with PET film by adhesive; and 3) coating a non-compounded surface of each of the first layer of aluminum foil and second layer of aluminum foil with the modified polyethylene (PE) adhesive, and drying to obtain the modified PE adhesive layer.

3. The method as claimed in claim 2, which comprises determining regions of the surface of layers of aluminum foil to be filled with aluminum nanoparticles by testing whether light passes through an untreated foil at a location in question.

4. The method as claimed in claim 3, wherein aluminum foil is passed into a dark box of aluminum foil air gap detection device from an aluminum foil unreeling roll under traction of an aluminum foil reeling roll; and when the surface of the aluminum foil is pervious to light, a photosensitive sensor located in the dark box is triggered to transmit a location signal of an air gap in the detected aluminum foil to a programmable logic controller (PLC); at the instant when the aluminum foil having air gaps passes through a nano-aluminum powder spraying nozzle in the nano-aluminum powder spraying nozzle, the PLC controller instructs the nano-aluminum powder spraying nozzle in a nano-aluminum powder spraying device to spray nano-aluminum powder to air gap portions on the surface of the aluminum foil; when the aluminum foil to which nano-aluminum powder is sprayed passes through a double-roll rolling roll in a nano-aluminum powder rolling forming device, nano-aluminum powder is compacted by the compacted by the double-roll rolling roll, excessive nano-aluminum powder on the surface of the aluminum foil is removed by a surface cleaning brush, and finally the aluminum foil is reeled by the aluminum foil reeling roll.

* * * * *